United States Patent [19]

Westcott

[11] Patent Number: 4,929,312
[45] Date of Patent: May 29, 1990

[54] SOLVENT RECOVERY APPARATUS AND METHOD

[76] Inventor: Robert D. Westcott, 1073 N. Grant, Canby, Oreg. 97013

[21] Appl. No.: 148,996

[22] Filed: Jan. 27, 1988

[51] Int. Cl.$^5$ .............................................. B01D 3/42
[52] U.S. Cl. .......................................... 203/2; 203/91;
203/DIG. 14; 203/DIG. 18; 203/DIG. 25;
134/12; 134/109; 137/512.15; 202/170;
202/176; 202/181; 202/185.3; 202/202;
202/205; 202/206
[58] Field of Search ................................ 202/168–170,
202/205, 202, 176, 181, 206, 185.3; 203/91, 94,
DIG. 14, DIG. 25, 1, 2, DIG. 18, 4; 134/10–12,
109; 137/512.15

[56] References Cited

U.S. PATENT DOCUMENTS

| | | | |
|---|---|---|---|
| 2,104,991 | 1/1938 | Höllerer | 202/168 |
| 2,243,093 | 5/1941 | Flahive | 202/170 |
| 3,039,941 | 6/1962 | Sweeney et al. | 202/185.3 |
| 3,080,302 | 3/1963 | Rogers et al. | 202/197 |
| 3,380,894 | 4/1968 | Flack et al. | 202/169 |
| 3,479,252 | 11/1969 | Holm et al. | 202/170 |
| 3,483,092 | 12/1969 | Young | 203/2 |
| 3,522,814 | 8/1970 | Olson | 134/111 |
| 3,577,320 | 5/1971 | Randell | 202/205 |
| 3,613,699 | 10/1971 | Holm | 134/57 R |
| 3,676,307 | 7/1972 | Black | 203/20 |
| 3,772,082 | 11/1973 | Dunn, Jr. | 134/10 |
| 3,889,710 | 6/1975 | Brost | 137/512.15 |
| 4,029,517 | 6/1977 | Rand | 134/11 |
| 4,038,155 | 7/1977 | Reber | 202/170 |
| 4,050,267 | 10/1977 | McFee | 202/185.3 |
| 4,096,039 | 6/1978 | Carnine et al. | 202/205 |
| 4,098,005 | 7/1978 | Wiarda | 34/73 |
| 4,101,340 | 7/1978 | Rand | 134/11 |
| 4,162,199 | 7/1979 | English | 203/39 |
| 4,233,120 | 11/1980 | Finlay-Maxwell | 203/2 |
| 4,337,121 | 6/1982 | English | 202/169 |
| 4,537,660 | 8/1985 | McCord | 202/170 |
| 4,613,412 | 9/1986 | MacDermid | 202/205 |
| 4,693,786 | 9/1987 | Brett et al. | 202/205 |
| 4,778,605 | 10/1988 | Anthoney et al. | 203/4 |

FOREIGN PATENT DOCUMENTS

| | | | |
|---|---|---|---|
| 54-35872 | 3/1979 | Japan | 202/170 |
| 54-58679 | 5/1979 | Japan | 202/170 |

*Primary Examiner*—Wilbur Bascomb
*Attorney, Agent, or Firm*—Klarquist, Sparkman, Campbell, Leigh & Whinston

[57] ABSTRACT

A solvent recovery system is provided which is characterized by improved efficiency and safety. The system includes an evaporator unit having a heat source for vaporizing contaminated solvent. The resulting vapors are subsequently liquified in a condensing unit. During evaporation and condensation of the solvent, a negative pressure is maintained within the system using a vacuum generator. After condensation, the liquid solvent passes into at least one accumulator which is periodically drained. The accumulator and vacuum generator operate in synchronization so that a vacuum is maintained in the system while drainage of the accumulator occurs. Since the evaporation and condensation systems of the invention are maintained at a negative pressure, any leaks therein do not result in the escape of flammable vapors.

18 Claims, 1 Drawing Sheet

SOLVENT RECOVERY APPARATUS AND METHOD

BACKGROUND OF THE INVENTION

The present invention generally relates to solvent recovery systems, and more particularly to a solvent recovery system capable of purifying contaminated solvent in a safe and efficient manner.

The use of organic solvents has become increasingly important in the cleaning and degreasing of metal components. Such components often include engine and other parts from motor vehicles. The components are cleaned by immersion within a solvent bath. As a result, grease, oil, and the like are removed and dissolved into the solvent.

However, the solvent that remains is contaminated. Disposal of the contaminated solvent presents a variety of problems. First, commercial solvents are relatively expensive. Disposal of the solvents on a large scale involves considerable cost. Also, the disposal of contaminated solvents, especially chlorinated solvents, represents a substantial environmental hazard.

From an economic and safety perspective, it is important that contaminated solvents be recycled in the most efficient manner possible. A variety of systems have been developed to purify contaminated solvents. For example, U.S. Pat. No. 2,153,577 to Levine discloses an apparatus having three separate cleaning tanks, each designed to contain contaminated solvent. The solvent in each of the tanks is heated, and the vapor condensed by overhead cooling coils. Condensate is then introduced into a water separator for water removal.

U.S. Pat. No. 4,003,798 to McCord discloses a bath-type cleaning apparatus comprising three chambers designed to contain contaminated solvent. The solvent in these chambers is heated, condensed, and collected in a fourth chamber.

Other solvent recovery systems of varying design are disclosed in U.S. Pat. Nos. 3,479,252 to Holm et al; 3,522,814 to Olson; 3,613,699 to Holm; 4,029,517 to Rand; 4,098,005 to Wiarda; 4,101,340 to Rand; 4,204,913 to Sabatka; 4,537,660 to McCord; 3,676,307 to Black; 4,038,155 to Reber; 3,772,082 to Dunn, Jr.; 4,337,121 to English; 4,233,120 to Finlay-Maxwell; and 4,162,199 to English.

Notwithstanding the systems described above, a need currently exists for a solvent recovery system of simple and efficient design capable of operating with a high degree of safety. Safety is especially important in view of the high flammability and toxic character of most conventional solvents. The present invention satisfies these goals and represents an advance in the art of solvent recovery, as described below.

SUMMARY OF THE INVENTION

In accordance with the present invention, a solvent recovery system is provided which is characterized by improved efficiency and safety. The system basically includes an evaporator unit having a heat source for vaporizing solvent from a contaminated body of such solvent. The resulting vapors are subsequently liquified in a condensing unit. During evaporation and condensation of the solvent, a negative pressure is maintained within the system using a vacuum generator. After condensation, the liquid solvent passes into at least one accumulator which is periodically drained. The accumulator and vacuum generator operate in synchronization so that a vacuum is maintained in the system while drainage of the accumulator occurs. Since the evaporation and condensation systems of the invention are maintained at a negative pressure, any leaks therein do not result in the escape of flammable vapors. Thus, the invention provides an enhanced degree of safety, while maintaining a high level of purification efficiency.

It is an object of the present invention to provide a solvent recovery apparatus and method which is highly efficient at purifying contaminated solvent.

It is another object of the invention to provide a solvent recovery apparatus and method which is simple and safe to use.

It is another object of the invention to provide a solvent recovery apparatus and method which uses a minimal number of operating components.

It is another object of the invention to provide a solvent recovery apparatus and method which is usable in either large or small scale operations.

It is a still further object of the invention to provide a solvent recovery apparatus and method which prevents the escape of solvent vapors should leaks occur in the system.

It is an even further object of the invention to provide a solvent recovery apparatus and method designed to avoid the use of high pressure operating conditions.

These and other objects, features, and advantages of the invention will be described in the following detailed description of a preferred embodiment and drawing.

DETAILED DESCRIPTION OF A PREFERRED EMBODIMENT

Figure 1:
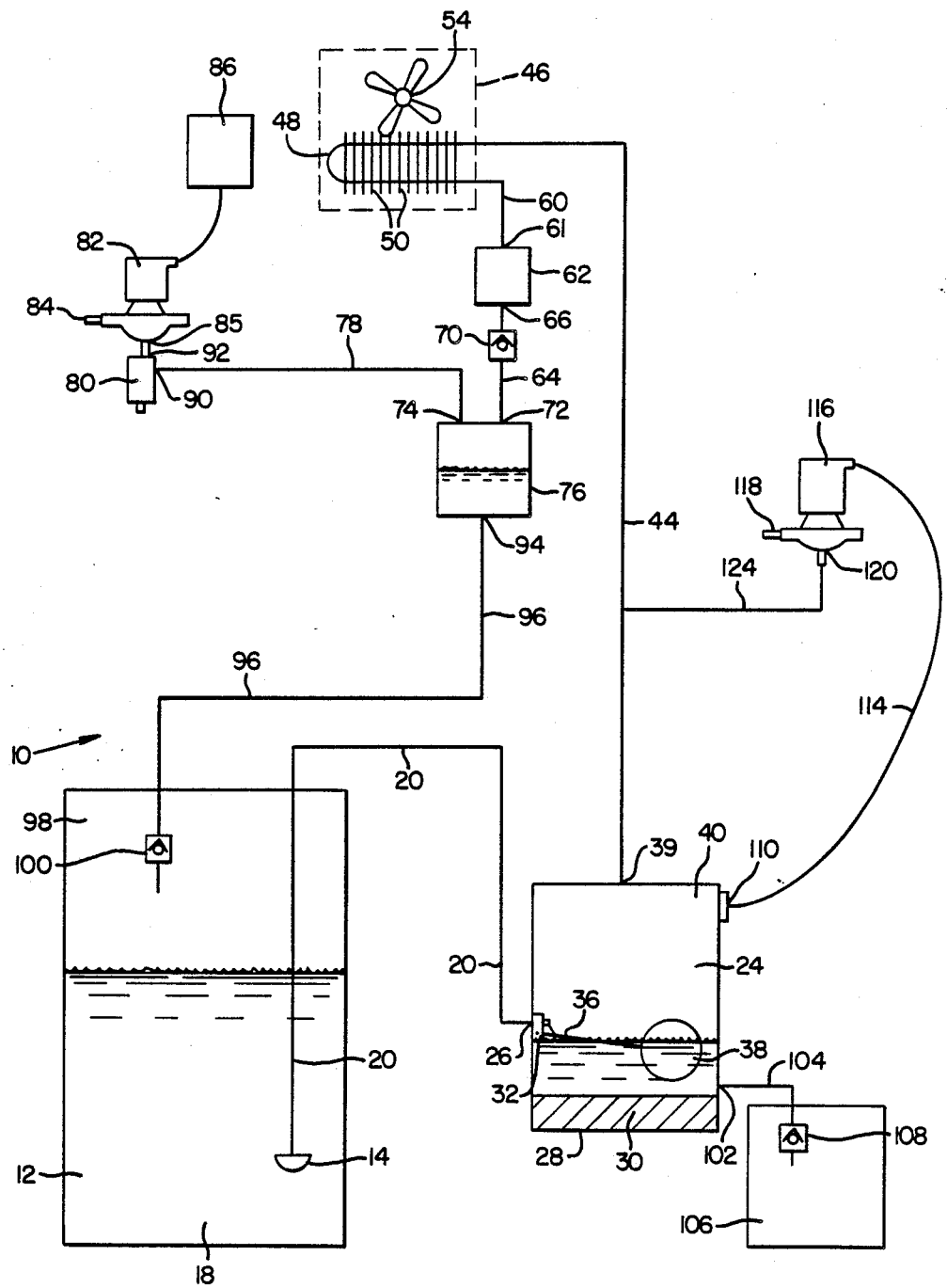
FIG. 1 is a schematic representation of a solvent recovery apparatus according to the present invention.

A solvent recovery system in accordance with the invention is schematically illustrated in FIG. 1 and designated by reference numeral 10. System 10 includes a vessel 12 which contains a supply of solvent. Parts contaminated with oil, grease or other lubricants are soaked in the solvent. This soaking may be accomplished in the vessel 12. Or, solvent can be removed from the vessel, used for cleaning, and then returned to the vessel. For most convenient access to the solvent, the vessel 12 is open to the atmosphere. An outlet 14 is located near the bottom 18 of the vessel 12. The outlet 14 communicates with a conduit 20 connected to an evaporator unit 24 having an inlet 26. The bottom 28 of the evaporator unit 24 includes a heater 30 preferably of the electrical resistance type.

To maintain a desired level of contaminated solvent within the evaporator unit 24, the inlet 26 is provided with a control valve 32. In the embodiment of FIG. 1, the control valve 32 has of a float assembly 36 using a buoyant member 38 which rises upwardly as the solvent level in evaporator unit 24 increases. When the solvent reaches a selected level, the control valve 32 and buoyant member 38 cooperate to close inlet 26, thereby preventing any additional flow of solvent into the evaporator unit 24.

Communicating with an outlet 39 at the top 40 of the evaporator unit 24, a conduit 44 is provided which leads to an air cooled condensing unit 46. The condensing unit 46 preferably includes a U-tube heat exchanger 48 having a plurality of externally-mounted cooling fins 50. A commercially available U-tube heat exchanger usable in the invention would include a unit manufactured by Haden, Inc., of Corona, California, Model No. TU10209G5. A motor driven blower 54 is positioned adjacent the heat exchanger 48. The blower 54 preferably has the capacity to move at least 100 cubic feet of air per minute across the heat exchanger 48 and cooling fins 50.

Connected to the heat exchanger 48 via a conduit 60 is the inlet 61 of a secondary accummulator 62. The accumulator 62 consists of an air-tight tank as small as 1 cubic inch or as large as 15 cubic inches, depending on the cycle/operating time of the system, which will be explained in greater detail below in the section entitled "Operation." The tank need not be of any special configuration and could be merely an extension of the conduit 60 so long as there is sufficient volume within the conduit.

A conduit 64 is connected to the outlet 66 of the accumulator 62 as shown in FIG. 1. Condensate flow through the conduit 64 is controlled by a pressure-sensitive check valve 70. The check valve 70, as well as the other check valves used in the system 10 must have the capacity to open and/or close with low head pressure. An example of a commercially available check valve usable in the system 10 is manufactured by the Miniature Precision Components Company, Inc., of Walworth, Wisconsin, Model No. A-202. This valve is extremely sensitive to presure changes, and incorporates an epichlorohydrin rubber diaphragm.

Downstream from the check valve 70, the conduit 64 leads into the inlet 72 of a primary accumulator 76 in the form of an air tight tank. The size of the accumulator 76 (20-120 cubic inches) will vary with the cycle/operating time of the system 10, as described in greater detail below. Adjacent the conduit 64 and communicating with a port 74 in the accumulator 76, a conduit 78 is provided which leads into a depressurization system preferably consisting of a vacuum transducer 80. The vacuum transducer 80 controls air flow into and out of the system 10.

The vacuum transducer 80 uses a venturi to create a vacuum, and has no moving parts. Its size is selected according to the overall size of system 10. A large evaporator/accumulator system will require the selection of a vacuum transducer with a correspondingly large vacuum flow (rated in standard cubic feet per minute [scfm]). For example, a vacuum transducer with flow capability of 0.21 scfm at zero inches Hg and a maximum vacuum force of 27.8 inches Hg will work satisfactorily with a 20 cubic inch accumulator and a one gallon head space evaporator. Such a transducer is available from the Air-Vac Engeneering Co,. Inc., of Milford, Connecticut, Model AVR-046H.

The vacuum transducer 80 is connected to a solenoid valve 82 of conventional design, preferably rated at 115 volts AC. Solenoid valve 82 includes an linlet port 84 for receiving air from a conventional source, and an outlet port 85, the function of which will be described below, Solenoid valve 82 also communicates with a timer 86 designed to operate the vacuum transducer 80 in cycles. Any conventional timer with either a fixed and/or adjustable control system using mechanical or electronic components will work effectively.

The vacuum transducer 80 includes a port 90 designed to allow air into and out of the system 10 when desired. Adjacent the port 90 is an inlet 92 for receiving compressed air from the outlet port 85 of the solenoid valve 82. The compressed air is used by the vacuum transducer 80 to create vacuum within the system 10.

Leading from outlet 94 in the accumulator 76 is a conduit 96 which terminates within the top 98 of the vessel 12. Provided at the end of the conduit 96 is a pressure sensitive check valve 100 of the same type as check valve 70.

A disposal system is provided to eliminate excess oil, grease and the like which has accumulated at the bottom 28 of the evaporator unit 24. An outlet 102 is provided adjacent the heater 30 which communicates with a conduit 104 leading into a waste accumulator tank 106. The outlet 102 terminates in a pressure-sensitive check valve 108 (of the same type as valve 70) designed to control the flow of waste into the tank 106. Positioned within the evaporator unit 24, a thermostatic switch 110 is provided which communicates through lead 114 with a solenoid valve 116. Solenoid valve 116 has an inlet 118 and an outlet 120 connected via a conduit 124 into conduit 44 as shown in FIG. 1.

Having herein described the components of the invention, the following "Operation" section will describe how the components function to purify and recover contaminated solvent.

OPERATION

The system 10 of the present invention is designed to operate in timed cycle wherein contaminated solvent is evaporated and collected, followed by removal from the system of collected solvent. This is accomplished as follows:

First, the operating cycle of the timer 86 is set. When timer 86 cycles into an "on" mode, the solenoid valve 82 is activated, which allows compressed air to enter the inlet 92 of the vacuum transducer 80. As a result, a vacuum is created by the vacuum transducer 80 which causes check valve 70 to open. This enables air to be drawn out of the system 10 through the port 90, and causes the evaporator unit 24, conduit 44, condensing unit 46, and accumulators 62, 76 to be maintained at a negative pressure. Simultaneously, the negative pressure causes check valve 100 to seat, preventing the entrance of air into the system 10 from the vessel 12.

Because a negative pressure now exists within the evaporator unit 24, contaminated solvent is drawn from the vessel 12 through the conduit 20 into the evaporator unit 24. Solvent continues to flow into the evaporator unit 24 through the inlet 26 until the buoyant member 38 of the float assembly 36 reaches a pre-selected level. When such level is achieved, the control valve 32 closes inlet 26 to prevent the entry of additional solvent.

The heater 30 is then activated, causing vaporization of the solvent in the evaporator unit 24. Vaporization is aided by negative pressure in the system. To achieve proper vaporization, the temperature of the heater 30 is adjusted in accordance with the type of solvent involved. The vaporized solvent subsequently passes upward through the top 40 of the evaporator unit 24, through the conduit 44, and into the condensing unit 46. The solvent vapor is liquified within the condensing unit 46 and passes through conduit 60, through the accumulator 62, through check valve 70, and into accumulator 76. As result, condensed solvent is temporarily stored within the accumulator 76.

When the timer 86 cycles to "off", the solenoid valve 82 stops the flow of compressed air into the inlet 92 of the vacuum transducer 80. As a result, the vacuum transducer 80 no longer generates a vacuum, and air flows into the system 10 through the port 90 until atmospheric pressure is achieved within the accumulator 76. During this procedure, check valve 70 seats in order to maintain a vacuum within the portions of the system 10 upstream from valve 70. This enables operation of the system 10 to continue during drainage of the accumulator 76, with condensed solvent being temporarily stored in accumulator 62. Solvent is retained within the accumulator 62 since check valve 70 remains closed, as described above.

Simultaneously with the closure of check valve 70, check valve 100 opens as atmospheric pressure is established within the accumulator 76. This allows condensed solvent within the accumulator 76 to flow through the conduit 96 back into the vessel 12 for reuse. When a negative pressure is again applied to the system 10 by the vaccum transducer 80, the check valve 100 seats, and check valve 70 opens, causing solvent temporarily stored within accumulator 62 to flow by gravity into accumulator 76. The system 10 then repeats the pattern of operation described above with the heater 30 operating continuously.

As the system 10 continues to operate, waste oil and contaminants are collected at the bottom 28 of the evaporator unit 24. In order to discharge these materials, the thermostatic switch 110 within the evaporator unit 24 is set at a pre-selected temperature. Temperatures within the evaporator unit 24 will increase as the contaminant levels at the bottom 28 of the unit 24 increase. Once the pre-selected temperature is reached, the thermostatic switch 110 activates the solenoid valve 116 which allows the entry of atmospheric air through the inlet 118 and simultaneously turns off the heater 30 in the evaporator unit 24. The air passes through outlet 120, conduit 124, conduit 44, and into the top 40 of evaporator unit 24. As a result, pressure is increased within the evaporator unit 24, causing the check valve 108 to open. This allows waste materials to pass through the outlet 102 at the bottom 28 of the evaporator unit 24, through the conduit 104, through the check valve 108 and into the tank 106 for disposal. When the evaporator unit 24 cools down to a pre-selected temperature, the thermostatic switch 110 deactivates solenoid valve 116 and turns on heater 30, thereby restoring the system 10 to an operational state. In addition, it should also be noted that when the system 10 is operating, the negative pressures produced by the vacuum transducer 80 cause the check valve 108 to seat, thereby preventing the entry of air into the evaporator unit 24 from the tank 106.

As described above, the present invention effectively purifies contaminated solvent in a safe and effective manner. Since a negative pressure is maintained in the evaporating and condensing portions of the system, any leakage therein will not result in an escape of potentially hazardous solvent vapors. Likewise, it has been discovered that solvent materials purified under negative pressure conditions do not have an offensive odor, as do solvent materials purified under pressure.

Insofar as the cycle time of system 10 is concerned, such time is variable, depending upon the size of the system and the solvent being purified. If the total cycle time (including both operating and drain cycles) is less than three minutes, the use of a relatively small accumulator 76 is appropriate. Since the accumulator 76 is small, the time needed for drainage will be sufficiently short that use of a tank-type accumultor 62 is unnecessary. Thus, if a short cycle time is used, the accumulator 62 becomes optional.

Having herein described a preferred embodiment of the present invention it is anticipated that modifications may be made by those skilled in the art within the scope of the invention. For example, the size of components used in the system may be varied, depending on the applications for which the system will be used. In addition, instead of the timer system described above, a modified arrangement may be used in which float sensors would be placed in the accumulators in order to sense fluid levels and activate the vaccum transducer. As an alternate method of cycling the system, the vacuum transducer 80 could be allowed to run continuously with a solenoid valve connected to the line 78 which extends between the transducer 80 and the primary accumulator 76, the valve being adapted to periodically vent the system and thereby allow pressure within the system to increase to atmospheric. Also, it would be possible to manually drain the evaporator unit, particularly if the solvent contaminent level is low or a large evaporator unit is used. Hand draining would allow the system to be built with one less thermostatic switch and solenoid. Other suitable modifications may be made to the invention, and its scope shall therefore be construed only in accordance with the following claims.

What is claimed is:

1. A solvent purification apparatus comprising:

a vessel for holding solvent, said vessel being open to the atmosphere;

evaporator means in fluid communication with said vessel for receiving contaminated solvent from said vessel and for vaporizing said solvent, said vaporizing of said solvent causing the separation of contaminants therefrom;

condensation means in fluid communication with said evaporator means for condensing said vaporized solvent;

accumulator means positioned between said condensation means and said vessel for temporarily storing condensed solvent received from said condensation means, said accumulator means comprising a primary accumulator chamber having an inlet communicating with said condensation means and an outlet for directing condensed solvent from said condensation means back into said vessel;

depressurization means for establishing a negative pressure within said accumulator means, evaporator means and condensation means, said negative pressure enhancing the operating efficiency of said apparatus;

a condensate control valve between said inlet of said primary accumulator chamber and said condensation means, said control valve comprising sensing means for automatically responding to changes in pressure within said apparatus, said sensing means of said control valve causing said control valve to remain open only so long as said depressurization means maintains a negative pressure in said accumulator chamber and to automatically close when said accumulator chamber is at atmospheric pressure;

a solvent return valve communicating with the outlet of said accumulator chamber, said return valve comprising sensing means for automatically responding to changes in pressure within said apparatus, said sensing means of said return valve causing said return valve to remain closed only so long as said depressurization means maintains a negative pressure in said accumulator chamber and to automatically open when said accumulator chamber is at atmospheric pressure; and control means operatively connected to said depressurization means for periodically allowing the accumulator chamber to return to atmospheric pressure.

2. The apparatus of claim 1 wherein said accumulator means further comprises a secondary accumulator chamber positioned between said condensate control valve and said condensation means.

3. The apparatus of claim 1 wherein said evaporator means comprises a closed containment tank having an inlet in fluid communication with said vessel, an outlet in fluid communication with said condensation means, and means for heating contaminated solvent so that said solvent may be vaporized.

4. The aparatus of claim 3 further comprising discharge means operatively connected to said containment tank for removing contaminants separated from said solvent.

5. The apparatus of claim 4 wherein said discharge means comprises a contaminant release valve in fluid communication with the bottom of said tank, said release valve comprising sensing means for automatically responding to changes in pressure within said apparatus, said discharge means further comprising means for allowing air into said tank to increase pressure upstream of said release valve to thereby cause said sensing means of said release valve to open said release valve and allow contaminants to flow from said tank through said contaminant release valve.

6. The apparatus of claim 3 wherein said inlet of said containment tank further comprises means for maintaining the solvent therein at a selected level.

7. The apparatus of claim 6 wherein said means for maintaining the solvent in said tank at a selected level comprises an inlet valve having a buoyant member attached thereto for sensing solvent levels within said tank.

8. The apparatus of claim 3 wherein said vessel comprises an inlet and an outlet, said outlet communicating with said inlet of said containment tank, and said inlet communicating with said outlet of said primary accumulator chamber.

9. The apparatus of claim 1 wherein said condensation means comprises at least one conduit having a plurality of cooling fins mounted on the exterior thereof, and a motor-driven fan adjacent said conduit for cooling said conduit.

10. The apparatus of claim 1 wherein said depressurization means comprises a timer-controlled vacuum pump.

11. A solvent purification apparatus comprising:

a vessel for holding solvent, said vessel being open to the atmosphere;

evaporator means in fluid communication with said vessel for receiving contaminated solvent from said vessel and for vaporizing said solvent, said evaporator means comprising a containment tank having an outlet, an inlet in fluid communication with said vessel, and means at the bottom of said tank for heating contaminated solvent so that said solvent may be vaporized, said vaporizing of said solvent causing the separation of contaminants therefrom;

condensation means in fluid communication with said evaporator means for condensing said vaporized solvent;

depressurization means for establishing a negative pressure within said evaporator means and condensation means, said negative pressure enhancing the operating efficiency of said apparatus;

conduit means for directing condensed solvent from said condensation means back into said vessel; and discharge means operatively connected to said containment tank for removing contaminants separated from said contaminated solvent, said discharge means comprising a pressure-activated contaminant release valve in fluid communication with the bottom of said tank and a temperature-controlled air valve for introducing air into said tank, said air valve opening when the temperature within said tank reaches a specified level, the opening of said air valve allowing air to enter said tank, said air increasing pressure upstream of said release valve to thereby cause said contaminant release valve to open.

12. The apparatus of claim 11 wherein said containment tank further comprises an inlet valve having a buoyant member attached thereto for sensing solvent levels within said tank.

13. A solvent purification apparatus comprising:

a vessel for holding solvent, said vessel being open to the atmosphere and comprising an inlet and an outlet;

evaporator means for receiving contaminated solvent from the vessel and for vaporizing said solvent, said evaporator means comprising a containment tank having an outlet, an inlet in communication with said outlet of said storage vessel, and means at the bottom of said tank for heating contaminated solvent so that said solvent may be vaporized, said vaporizing of said solvent causing the separation of contaminants therefrom;

discharge means operatively connected to said containment tank for removing contaminants separated from said contaminated solvent, said discharge means comprising a contaminant release valve in fluid communication with the bottom of said tank, and a temperature controlled air valve for introducing air into said tank, said air valve opening when the temperature within said tank reaches a specified level, the opening of said air valve allowing air to enter said tank, said air causing said contaminant release valve to open;

condensation means in fluid communication with said outlet of said containment tank for condensing said vaporized solvent;

accumulator means positioned between said condensation means and said vessel for temporarily storing condensed solvent received from said condensation means, said accumulator means comprising a primary accumulator chamber having an inlet and outlet, said inlet communicating with said condensation means, said accumulator means further comprising a condensate control valve between said inlet of said primary accumulator chamber and said condensation means;

depressurization means for establishing a negative pressure within said evaporator means, condensation means and accumulator means, said depressurization means comprising a timer-controlled vacuum pump communicating with the interior of said primary accumulator chamber, said negative pressure within said evaporator means, condensation means and accumulator means enhancing the operating efficiency of said apparatus; and conduit means for directing condensed solvent from said condensation means back into said vessel, said conduit means communicating with said outlet of said primary accumulator chamber and said inlet of said vessel, said inlet of said vessel further comprising a control valve to control the flow of condensed solvent from said primary accumulator chamber into said vessel.

14. The apparatus of claim 13 wherein said accumulator means further comprises a secondary accumulator chamber positioned between said condensate control valve and said condensation means.

15. A method for the purification of solvent materials comprising:

introducing solvent having contaminants therein from a holding vessel at ambient pressure into a containment tank;

heating said contaminated solvent in said containment tank so as to vaporize said solvent, said vaporization causing the separation of contaminants therefrom;

maintaining the pressure within said containment tank at below atmospheric levels during vaporization;

condensing said vaporized solvent in a condenser means in fluid communication with said containment tank;

collecting condensed solvent in at least one accumulator chamber, said accumulator chamber communicating with said condenser means and having a condensate control valve therebetween comprising sensing means for automatically responding to changes in pressure, said sensing means of said control valve causing said control valve to remain open only so long as the pressure within said accumulator chamber is below atmospheric levels; and selectively allowing said condensed solvent to flow from said accumulator chamber back into said holding vessel through a solvent return valve between said accumulator chamber and said holding vessel, said solvent return valve comprising sensing means for automatically responding to changes in pressure, said sensing means of said return valve causing said return valve to remain closed only so long as the pressure within said accumulator chamber is below atmospheric levels, and to automatically open and allow condensed solvent to flow into said holding vessel when said accumulator chamber is at atmospheric pressure.

16. A solvent purification apparatus comprising:

evaporator means for receiving contaminated solvent and for vaporizing said solvent, said vaporizing of said solvent causing the separation of contaminants therefrom;

condensation means in fluid communication with said evaporator means for condensing said vaporized solvent;

accumulator means positioned downstream of said condensation means for temporarily storing condensed solvent received from said condensation means, said accumulator means comprising an accumulator chamber having an inlet communicating with said condensation means and an outlet for said condensed solvent;

depressurization means for establishing a negative pressure within said accumulator chamber, evaporator means and condensation means, said negative pressure enhancing the operating efficiency of said apparatus;

a condensate control valve between said inlet of said accumulator chamber and said condensation means, said control valve comprising sensing means for automatically responding to changes in pressure within said apparatus, said sensing means of said contorl valve causing said control valve to remain open only so long as said depressurization means maintains a negative pressure in said accumulator chamber and to automatically close when said accumulator chamber is at atmospheric pressure;

a solvent return valve communicating with the outlet of said accumulator chamber for the release of condensed solvent therefrom, said return valve comprising sensing means for automatically responding to changes in pressure within said apparatus, said sesing means of said return valve causing said return valve to remain closed only so long as said depressurization means maintains a negative pressure in said accumulator chamber and to automatically open when said accumulator chamber is at atmospheric pressure; and control means operatively connected to said depressurization means for periodically allowing said accumulator chamber to return to atmospheric pressure.

17. A solvent purification apparatus comprising:

a vessel for holding solvent, said vessel being open to the atmosphere;

evaporator means in fluid communication with said vessel for receiving contaminated solvent from said vessel and for vaporizing said solvent, said vaporizing of said solvent causing the separation of contaminants therefrom, said evaporator means comprising a closed containment tank having an inlet in fluid communication with said vessel, an lutlet, and means for heating contaminated solvent so that said solvent may be vaporized;

condensation means in fluid communication with said outlet of said containment tank for condensing said vaporized solvent;

accumulator means positioned between said condensation means and said vessel for temporarily storing condensed solvent received from said condensation means, said accumulator means comprising a primary accumulator chamber having and inlet communicating with said condensation means and an outlet for directing condensed solvent from said condensation means back into said vessel;

depressurization means for establishing a negative pressure within said accumulator means, evaporator means, and condensation means, said negative pressure enhancing the operating efficiency of said apparatus;

a pressure-activated condensate control valve between said inlet of said primary accumulator chamber and said condensation means, said valve being constructed to remain open only so long as said depressurization means maintains a negative pressure in said accumulation chamber;

a pressure-activated solvent return valve communicating with the outlet of said accumulator chamber, said return valve being constructed to remain closed only so long as said depressurization means maintains a negative pressure in said accumulator chamber;

control means operatively connected to said depressurization means for periodically allowing the accumulator chamber to return to atmospheric pressure; and discharge means operating connected to said containment tank for removing contaminants separated from said solvent, said discharge means comprising a pressure-activated contaminant release valve in fluid communication with the bottom of said tank, and means for allowing air into said tank to increase pressure upstream of said release valve in order to open said release valve and allow contaminants to flow from said tank through said contaminant release valve, said means for allowing air into said tank comprising a temperature-controlled air valve, said air valve opening when the temperature within said tank reaches a specified level, the opening of said air valve allowing air to enter said tank, said air causing said contaminant release valve to open.

18. A solvent purification apparatus comprising:

evaporator means for receiving contaminated solvent and for vaporizing said solvent, said vaporizing of said solvent causing the separation of contaminants therefrom;

condensation means in fluid communication with said evaporator means for condensing said vaporized solvent;

accumulator means positioned downstream of said condensation means for temporarily storing condensed solvent received from said condensation means, said accumulator means comprising an accumulator chamber having an inlet communicating with said condensation means and an outlet for said condensed solvent;

depressurization means for establishing a negative pressure within said accumulator means, evaporator means, and condensation means, said negative pressure enhancing the operating efficiency of said apparatus;

a condensate control valve between said inlet of said accumulator chamber and said condensation means, said control valve comprising sensing means for automatically responding to changes in pressure within said apparatus, said sensing means of said control valve causing said control valve to remain open only so long as said depressurization means maintains a negative pressure in said accumulator chamber and to automatically close when said accumulator chamber is at atmospheric pressure; and a solvent return valve communicating with the outlet of said accumulator chamber, said return valve comprising sensing means for automatically responding to changes in pressure within said apparatus, said sensing means of said return valve causing said return valve to remain closed only so long as said depressurization means maintains a negative pressure in said accumulator chamber and to automatically open when said accumulator chamber is at atmospheric pressure.

* * * * *

UNITED STATES PATENT AND TRADEMARK OFFICE
CERTIFICATE OF CORRECTION

PATENT NO. : 4,929,312

DATED : May 29, 1990

INVENTOR(S) : Robert D. Westcott

It is certified that error appears in the above-identified patent and that said Letters Patent is hereby corrected as shown below:

```
Column 3,  line 57, "linlet" should be --inlet--.
Column 4,  line 28, "cycle" should be --cycles--.

Column 10, line 40, "lutlet" should be --outlet--.
Column 10, line 9,  "contorl" should be --control--.
Column 10, line 20, "sesing" should be --sensing--.
Column 10, line 50, "and inlet" should be --an inlet--.
Column 11, line 7,  "operating" should be --operatively--.
```

Signed and Sealed this

Third Day of December, 1991

*Attest:*

HARRY F. MANBECK, JR.

*Attesting Officer*      *Commissioner of Patents and Trademarks*